United States Patent [19]

Roettgen et al.

[11] Patent Number: 4,520,767

[45] Date of Patent: Jun. 4, 1985

[54] LOW FLOW COOLING SYSTEM AND APPARATUS

[75] Inventors: Leslie A. Roettgen; Beth A. Webber; Robert M. Brooks; Robert J. Layman, all of Columbus, Ind.

[73] Assignee: Cummins Engine Company, Columbus, Ind.

[21] Appl. No.: 533,099

[22] Filed: Sep. 16, 1983

[51] Int. Cl.³ ............................ F01P 3/12; F01P 7/16
[52] U.S. Cl. ............................... 123/41.1; 123/41.31; 123/41.33; 165/43; 236/34.5
[58] Field of Search ................. 123/41.08, 41.09, 41.1, 123/41.31, 41.33, 196 AB; 236/34.5, 101 A, 101 B; 165/43

[56] References Cited

U.S. PATENT DOCUMENTS

| | | | |
|---|---|---|---|
| 1,931,935 | 10/1933 | Paugh | 123/196 AB |
| 2,098,712 | 11/1937 | Reynolds | 123/41.08 |
| 2,334,457 | 11/1943 | Underwood | 123/41.08 |
| 2,435,041 | 1/1948 | Hild | 123/41.08 |
| 2,536,642 | 1/1951 | Holley | 123/41.33 |
| 3,741,477 | 6/1973 | Sparks | 236/34.5 |
| 3,851,629 | 12/1974 | Mayr et al. | 123/41.08 |
| 3,863,612 | 2/1975 | Wiener | 123/41.08 |
| 3,877,443 | 4/1975 | Henning et al. | 123/41.08 |
| 4,011,988 | 3/1977 | Inagaki | 123/41.08 |
| 4,032,068 | 6/1977 | Luchtenberg et al. | 236/34.5 |
| 4,370,950 | 2/1983 | Furukubo | 123/41.08 |

Primary Examiner—William A. Cuchlinski, Jr.
Attorney, Agent, or Firm—Neuman, Williams, Anderson & Olson

[57] ABSTRACT

The disclosure illustrates a cooling system for a turbocharged diesel engine having an aftercooler and an oil cooler. The cooling system is defined by two flow loops, one for the engine and the other for cooling purposes. An engine driven pump circulates a coolant through the engine block and cylinder heads. The pump also circulates coolant through the cooling loop which includes the engine oil cooler immediately upstream of a radiator and bypass line. The aftercooler is downstream of the radiator and bypass line. Placement of the oil cooler ahead of the radiator and bypass line produces a higher temperature potential which permits a reduction in radiator size in addition to other benefits. A flow control logic system embodied in a dual thermostat arrangement ahead of the radiator and bypass line minimizes mixing of bypass flow with radiator flow and reduces radiator flow rates to permit low aftercooler temperatures that hithertofore have not been achievable.

14 Claims, 11 Drawing Figures

LOW FLOW COOLING SYSTEM AND APPARATUS

FIELD OF THE INVENTION

This invention relates to a new cooling system and apparatus for internal combustion engines, and in particular, for a diesel engine having an oil cooler. This invention also relates to a logic control system and apparatus for improving the performance of internal combustion engine cooling systems having a radiator and a bypass line in parallel.

BACKGROUND OF THE INVENTION

Cooling systems for internal combustion engines, including diesel engines, are well known in the art. Typically, such systems have employed a temperature sensitive valve (thermostat) to direct the flow of the coolant medium in the system through a heat exchanger (radiator) or through a bypass line around the heat exchanger. Such systems have successfully been employed in automobile engines and the like.

Advances over the years in engine technology, however, and particularly in diesel engine technology, have caused increasing demands to be placed on the cooling systems for internal combustion engines. For example, many diesel engines are now turbocharged. In compressing the air charged to the engine's cylinders, however, the turbocharger also causes the temperature of the air to increase. Accordingly, it is desirable to provide means for cooling the compressed air prior to its being charged to the cylinders, and thereby improve combustion efficiency, by means of a heat exchanger, commonly referred to as an aftercooler. The efficiency of the aftercooler depends in part on the difference in temperatures between the coolant and the compressed air; the greater the temperature potential, the greater will be the capability of the aftercooler in cooling the compressed air.

The cooling system should also be responsive to the engine's cooling demands under partial load conditions. Under partial load, the cooling requirement of the engine block and cylinder heads are less than the cooling requirements under full load; nevertheless, it may still be desirable to maintain maximum cooling efficiency of the aftercooler or other engine components. Accordingly, in order to maintain the engine at a relatively constant temperature, regardless of the load on the engine, and still satisfy the demands of the engine's other components, it is advantageous to provide the engine with a cooling system capable of regulating the amount of cooling to the engine by independently controlling the flow of coolant through the radiator and through the bypass line around the radiator.

Other important considerations in the design of an engine's cooling system relate to the design size of the engine's radiator. Typically, the radiator is made from expensive materials such as copper and aluminum. It is therefore highly desirable to minimize the size of the radiator, consistent with maintaining the ability of the radiator to handle the maximum design heat rejection load of the engine. As with an aftercooler, the efficiency of the radiator as a heat exchanger is dependent in part on the temperature difference or potential between the temperature of the coolant entering the radiator and the ambient air temperature. By maximizing this temperature potential, the engine designer can employ a smaller or more cost effective heat exchange unit.

The prior art has recognized some of the problems inherent in efficiently satisfying the various cooling demands of a diesel engine having an aftercooler. One attempt at solving these problems is described in U.S. Pat. No. 3,863,612 to Wiener. The Wiener patent ignores other features and elements of a diesel engine, however, which place additional demands upon and creates additional problems for the cooling system. For example, a modern diesel cooling system should be responsive to the demands of the engine's oil cooler, which is an important element for increasing the life and durability of the engine. The cooling system should also accommodate other elements, such as auxiliary heaters for the driver's cab and for the diesel fuel.

Moreover, to enhance the engine's efficiency when operating at cold ambient temperatures, and for smooth and efficient operation during start-up, the cooling system should also ideally be capable of not only cooling the engine, but of heating the engine's charge air as well. Also, because of changes in ambient temperature and the different demands on the cooling system during start-up, the cooling system should ideally have control logic which independently senses and anticipates the heating and the cooling demands of the engine.

SUMMARY OF THE INVENTION

It is an object of the present invention to provide a cooling system for an internal combustion engine which overcomes the shortcomings of the prior art.

It is a further object of the present invention to provide a cooling system for a diesel engine which is responsive to the cooling and heating demands of the engine, the aftercooler and the oil cooler.

It is a further object of the present invention to provide a low flow cooling system for an internal combustion engine which improves the cooling efficiency of the radiator, and thus permits a reduction in the radiator's size, or other performance variables.

It is a further object of the present invention to provide a logic control system for the cooling system of an internal combustion engine which is independently responsive to the cooling and heating requirements of the engine.

These and other objects are achieved by the present invention which provides a cooling system for internal combustion engines in which the flow of a fluid heat exchange medium may be defined by two flow loops, namely, an engine loop and a cooling loop. In the engine loop, the heat exchange medium (coolant) is circulated by a pump through the engine's block and cylinder heads and then returned to the pump inlet. The pump also circulates the coolant through the cooling loop. The elements of the cooling loop include at least the oil cooler and, in combination, a radiator and bypass passage in parallel connection. The coolant discharged from the oil cooler is directed to the combination and provides a greater temperature potential to the radiator than has heretofore been provided in the prior art. An aftercooler may also conveniently be provided downstream of the radiator/bypass passage combination.

Another aspect of the present invention relates to a novel logic control system which improves the efficiency of internal combustion engine cooling systems having a radiator in parallel connection to a bypass passage. The logic control system independently controls the flow of coolant through the bypass passage and the radiator, and includes temperature sensing means for sensing the temperature of the coolant at one or more locations in the cooling system. If the temperature sensed for bypass control is below a first setpoint temperature, the control system permits maximum flow of coolant through the bypass passage. The control system selectively controls the coolant flow through the bypass passage when the sensed temperature is greater than the first setpoint temperature but less than a second setpoint temperature greater than the first. When the sensed temperature exceeds the second setpoint temperature, the control system prevents flow through the bypass passage. Cooling control is similarly effected by the control system. If the temperature sensed for cooling control is less than a third setpoint temperature, then the control system prevents coolant flow through the radiator. The control system selectively controls coolant flow through the radiator when the sensed temperature exceeds the third setpoint temperature but is less than a fourth setpoint temperature greater than the third. When the sensed temperature exceeds the fourth setpoint temperature, the control system permits maximum flow through the radiator.

The logic control system can conveniently be implemented on a modern diesel engine through use of a new dual valve thermostat. The thermostat has a housing which defines four chambers: upper and lower bypass control chambers and upper and lower cooling control chambers. The dual valve thermostat has a cooling control valve and a bypass control valve for selectively controlling the flow of coolant from one chamber to the other. The valves open or close in accordance with the parameters of the logic control system described above, except that the temperatures for cooling control and for bypass control are sensed at the same location.

DESCRIPTION

The following detailed description is illustrative of the best mode presently known for carrying out the invention, and is not to be interpreted as limiting the disclosure.

Figure 1:
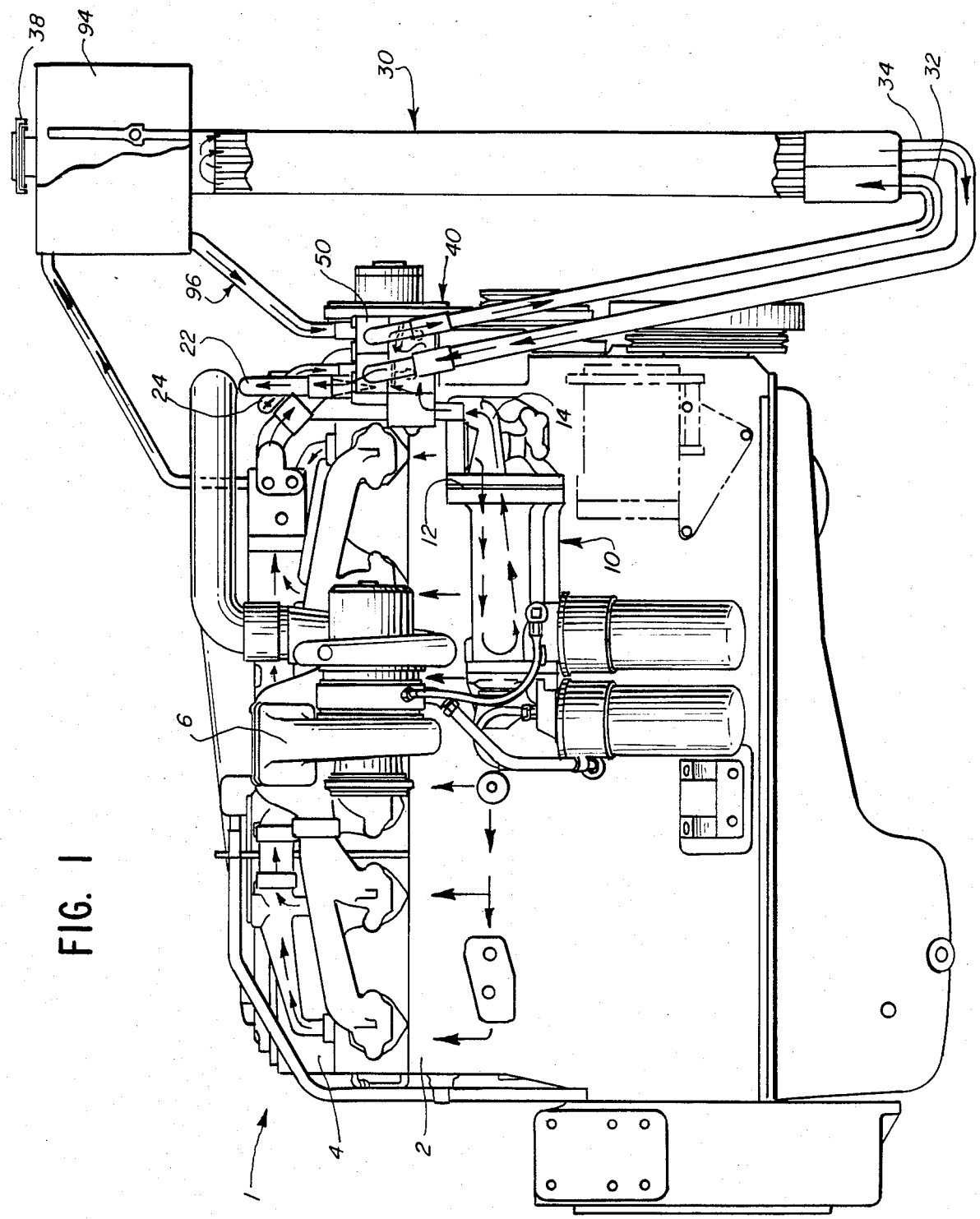
FIG. 1 is a side elevation view of one embodiment of the improved cooling system shown installed in a diesel engine.

FIG. 1 shows the invention installed on a diesel engine 1. The arrows indicate the flow path of the coolant (heat exchange medium), typically a mixture of water and antifreeze, when the system is operating in a full cooling mode. The full cooling mode will be described more fully hereinafter. The engine includes the engine block and cylinder liners 2 and cylinder heads 4. Also included is a turbocharger 6 for compressing the air charged to the engine cylinders. A typical oil cooler 10 is shown having inlet 12 and outlet 14. Also shown is a multipass radiator 30 with inlet 32 (also known as engine outlet) and radiator outlet 34 (also known as engine inlet). A pump 40 for the coolant is shown with one embodiment of the new logic control system, namely, a dual valve thermostat 50, assembled and attached thereto.

Figure 2:
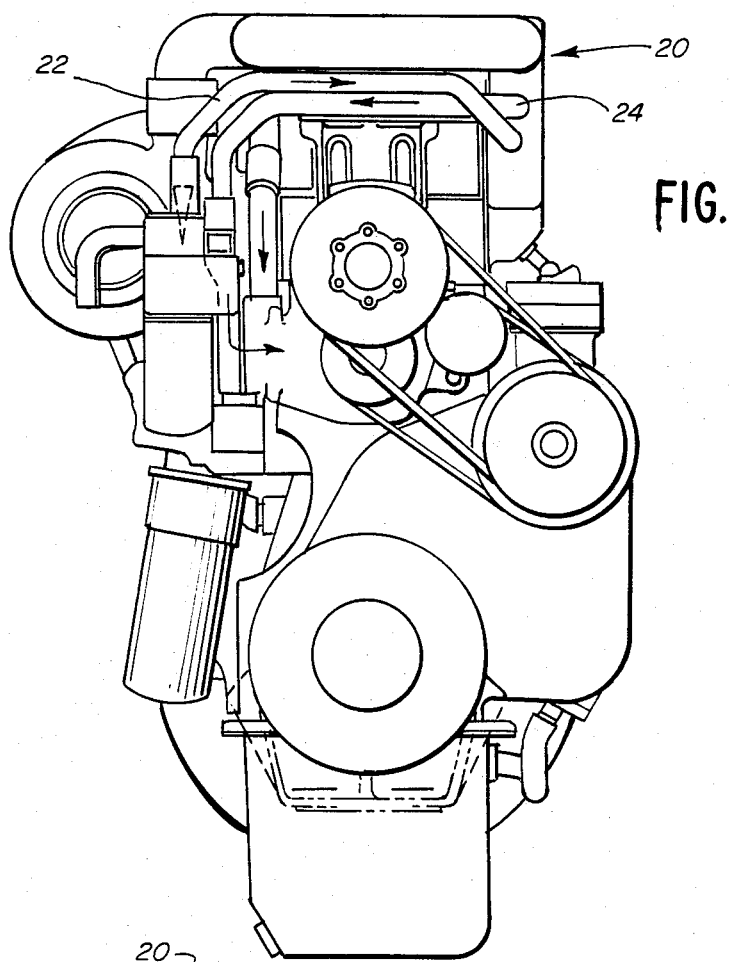
FIG. 2 is a front elevation view of the diesel engine of FIG. 1.

Turning to FIG. 2, it will be observed by one of ordinary skill in the art that the diesel engine 1 is equipped with an aftercooler assembly 20 with an inlet 22 for receiving a supply of the coolant and an outlet 24 to return the coolant to the water pump 40.

Figure 3:
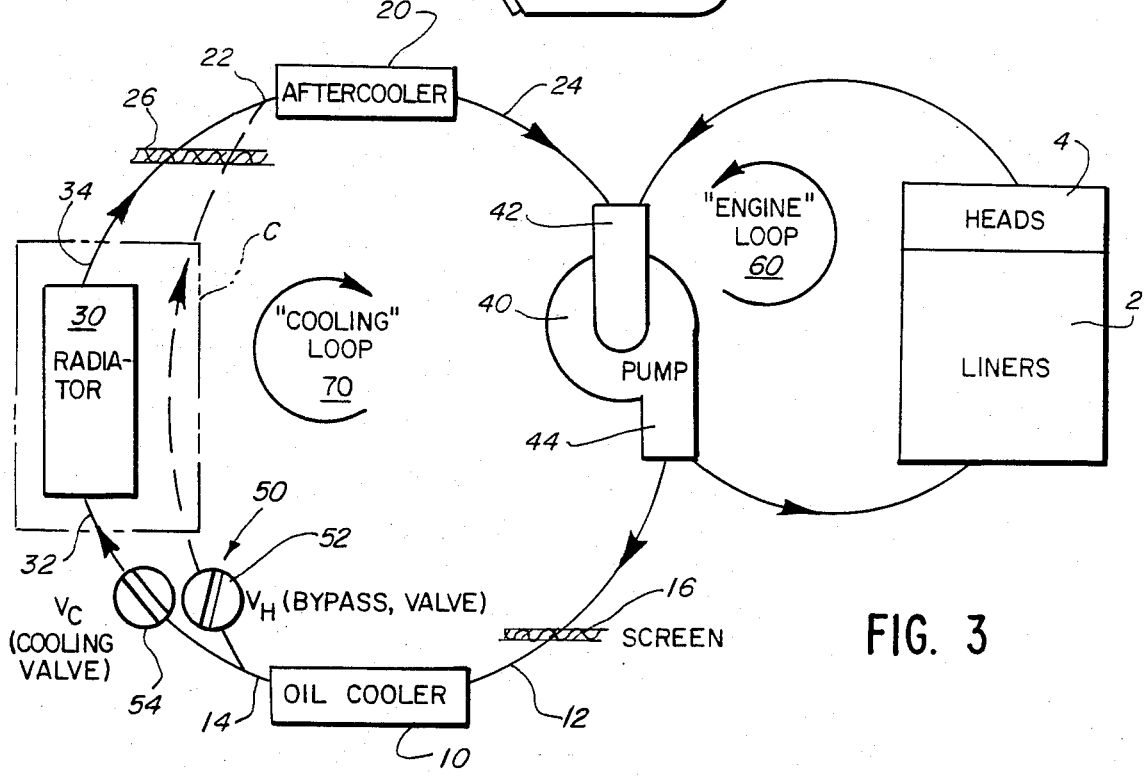
FIG. 3 is a schematic flow diagram of the improved cooling system shown in a full cooling mode.

There is schematically shown in FIG. 3 two flow paths (e.g. engine loop 60 and cooling loop 70) for the coolant in one embodiment of the cooling system of the present invention. In the engine loop 60, a pump 40 is provided which delivers part of the coolant to the engine's block 2 and cylinder heads 4. The coolant circulates through the cylinder liners 2 and heads 4, removing heat, and then returns to inlet 42 of the pump 40.

The cooling loop 70 in the illustrated embodiment includes the following components connected in series relation: (a) an oil cooler 10 of conventional design having the inlet side 12 thereof connected to the discharge side 42 of pump; (b) a combination of a conventional heat exchanger (radiator) 30 and a bypass pipe section 35, both of which being in parallel connection disposed downstream from the oil cooler; (c) a logic control system assembly 50 disposed at the inlet side of the combination; and (d) a conventional aftercooler 20 disposed downstream of the combination C. Conveniently, oil cooler screen 16 and aftercooler screen 26 can also be employed in the cooling loop 70.

The cooling loop 70 is shown in FIG. 3 while the system is operating in a full cooling or first mode. In the full cooling mode the oil cooler 10, the heat exchanger or radiator 30, and the aftercooler 20 are hydraulically coupled. The logic control system causes the coolant discharged from the oil cooler 10 to be directed through only the radiator 30 of the combination C and from radiator 30 to aftercooler 20. The full cooling mode is dictated in this embodiment by the temperature of the coolant at the outlet 14 of the oil cooler 10 as sensed by the temperature sensing means of the logic control system. In this particular embodiment, the temperature sensing means are included in the dual valve thermostat 50. When the sensed temperature exceeds a first setpoint temperature, typically in the range of 190° to 195° F., the bypass valve section 52 of the thermostat 50 is in a seated or closed position and the coolant is directed by cooling valve section 54 of the thermostat 50, which is in an open position, to the radiator inlet 32. See FIG. 6. After the coolant circulates through the radiator 30, its temperature is significantly decreased and it is discharged to the aftercooler inlet 22. In this mode the temperature potential of the coolant to the aftercooler 20 is maximized, promoting efficient operation of the diesel engine 1.

An important advantage of the cooling system described in FIG. 3 is the presence of oil cooler 10 in the cooling loop 70 directly upstream of the radiator 30. The oil cooler 10 can typically operate at temperatures significantly higher than can be tolerated by the engine block 2 or cylinder liners 4. Accordingly, it contributes additional heat to the coolant which raises the coolant's temperature above the temperature at which it would otherwise enter the radiator 30. This increase in temperature improves the temperature potential across the radiator 30 which in turn permits the use of a smaller or more cost effective radiator 30 and associated fan assembly. For example, it has been calculated for the cooling system shown in FIG. 3 that when the oil cooler 10 is not in circuit the temperature of the coolant to the radiator 30 is about 204° F. for a given engine heat rejection load. For the same heat rejection load, however, placing the oil cooler 10 in circuit as shown in FIG. 3 increases the temperature of the coolant to the radiator 30 to about 214° F. This temperature increase gives the engine designer the option of reducing the radiator frontal area by 25%, of reducing the number of fins-per-inch on the airside of the radiator core by 25%, or of utilizing a reduction in air horsepower (power consumed by the radiator fan) of 47%.

The system of FIG. 3 operates in a full bypass or second mode when the temperature of the coolant discharged from the outlet 14 of the oil cooler 10 is sensed by the dual valve thermostat 50 as being equal to or below a second setpoint temperature, typically in the range of 140° to 145° F. In this circumstance, which typically occurs during engine start-up, cooling valve section 54 is seated or closed, blocking all flow of coolant to the radiator 30, whereas bypass valve section 52 is simultaneously in an open condition thus directing the coolant directly to the inlet 22 of aftercooler 20. Thus, it will be observed during the second mode that oil cooler 10 is fluidly in series with the bypass pipe section 35 and the aftercooler 20, and that radiator 30 is completely bypassed. This permits the engine charge air to be heated during start-up which significantly improves the combustion efficiency during the start-up period, and also helps reduce noxious emissions.

The cooling system of the present invention will also , of course, operate in modes between the full cooling and the full bypass modes. In accordance with other aspects of the invention described hereinafter, the amount of coolant passing through the bypass passage 35 and the radiator 30 may be controlled independently by controlling the operating characteristics of bypass valve section 52 and cooling valve section 54.

Figure 4:
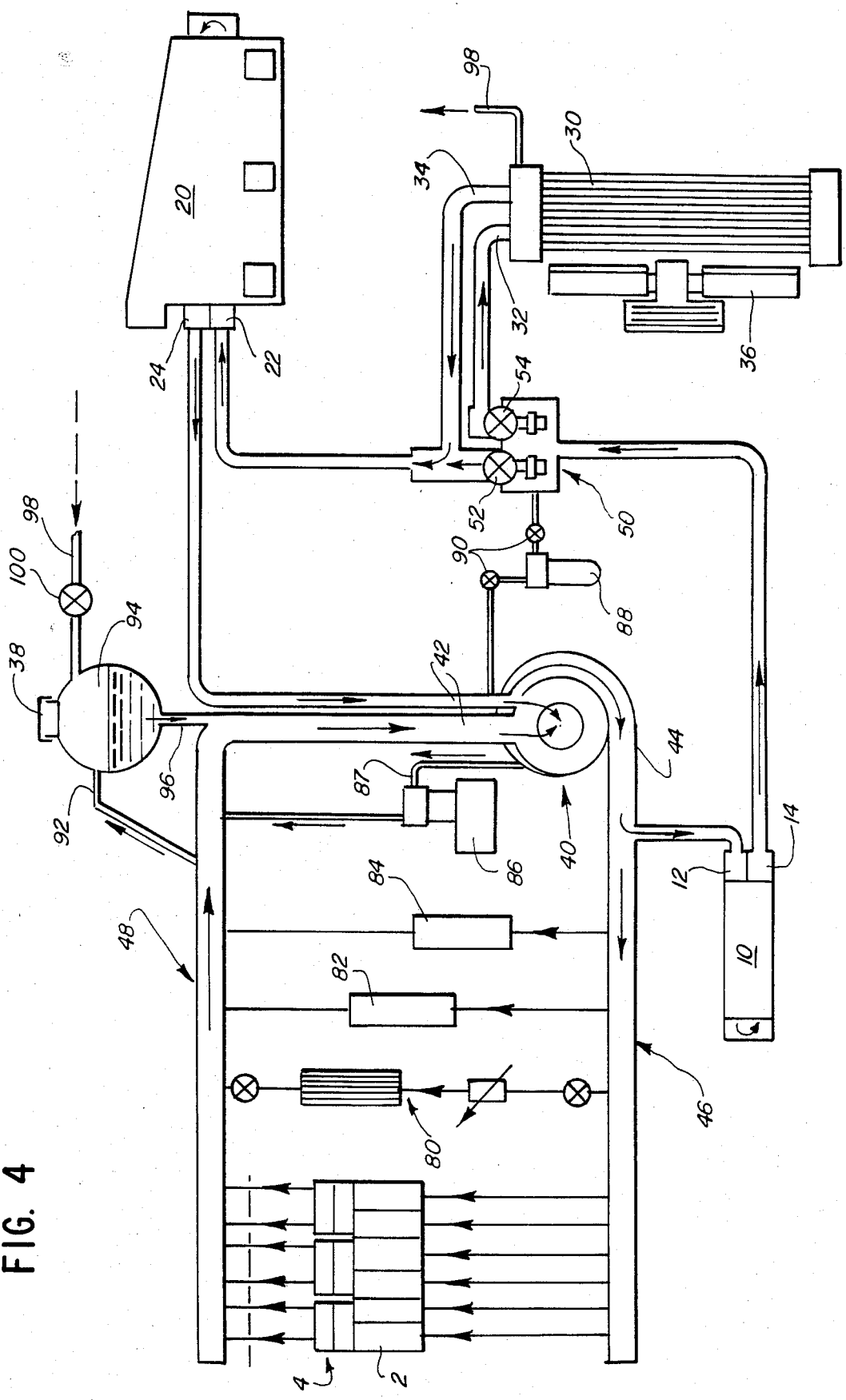
FIG. 4 is a detailed schematic representation of a diesel engine embodying the improved cooling system and showing the interrelationship of various components of the system and the diesel engine.

Turning to FIG. 4, the present invention is shown in a more detailed schematic and its relationship to various other elements of a modern diesel engine is illustrated. As shown, the coolant from the outlet 44 of pump 40 splits in predetermined portions in part to the inlet 12 of oil cooler 10 with the remainder being directed through the pump discharge block manifold 46. From the pump discharge block manifold 46, the coolant is directed through a plurality of pathways to each of the engine's cylinder liners 2 and then through the cylinder heads 4 before being discharged into the cylinder head return manifold 48. Also disposed in circuit between the pump discharge block manifold 46 and the cylinder head return manifold 48, there may be located cab heater assembly 80, auxiliary heaters 82 for heating the engine fuel and providing heat for other auxiliary functions, and auxiliary coolers 84 for cooling such auxiliary aspects of a modern diesel powered vehicle as its transmission and the like. Air compressor 86 may also similarly be fluidly coupled in the circuit, although for convenience the air compressor supply line 87 may be fluidly coupled directly to the pump 40.

The portion of the coolant directed to the inlet 12 of oil cooler 10 passes through said oil cooler 10 and is then returned through oil cooler outlet 14 to the dual valve thermostat 50 of the present invention. As illustrated, the dual valve thermostat 50 includes bypass valve section 52 and cooling valve section 54. The diesel engine 1 may also typically be provided with corrosion resistor 88 having check valves 90, one check valve 90 being disposed between the thermostat 50 and the corrosion resistor 88, and the other check valve 90 being disposed between the corrosion resistor 88 and the inlet 42 for pump 40. The coolant passing bypass valve 52 proceeds to the inlet 22 of aftercooler 20 and then through the outlet 24 back to the inlet 42 of pump 40.

As also illustrated in FIG. 4, a portion of the coolant from oil cooler 10 can also pass through cooling valve 54 where it is directed to the inlet 32 of radiator 30. Typically, radiator 30 is also provided with a fan 36, a radiator vent line 98, radiator vent line check valve 100, expansion tank 94, and radiator pressure cap 38. Fluidly coupled to the radiator expansion tank 94 there is typically provided an engine vent line 92 and a fill line 96 for the cooling system.

Returning to the radiator outlet 34, it will be observed that the cooling system can be operated so that the coolant from the radiator 30 is combined with the coolant from the oil cooler 10 which passes bypass valve 52. The combined flow then proceeds to the inlet 22 of aftercooler 20. As discussed in connection with other aspects of the invention, the operation of the cooling system can also be controlled to prevent or minimize the combining of the coolant from the radiator 30 with the coolant from bypass passage 35, thus maximizing the temperature potential across the aftercooler 20 after warm-up, while also maximizing heating of the charge air during the warm-up period. In a full bypass mode, it is apparent from the above description that all the coolant from the oil cooler 10 will be diverted directly to the inlet 22 of aftercooler 20. Similarly, it will be observed that in a full cooling mode, the closure or seating of bypass valve 52 and the opening of cooling valve 54 directs the entire flow of coolant from oil cooler 10 through radiator 30 and then to aftercooler 20.

Figure 5:
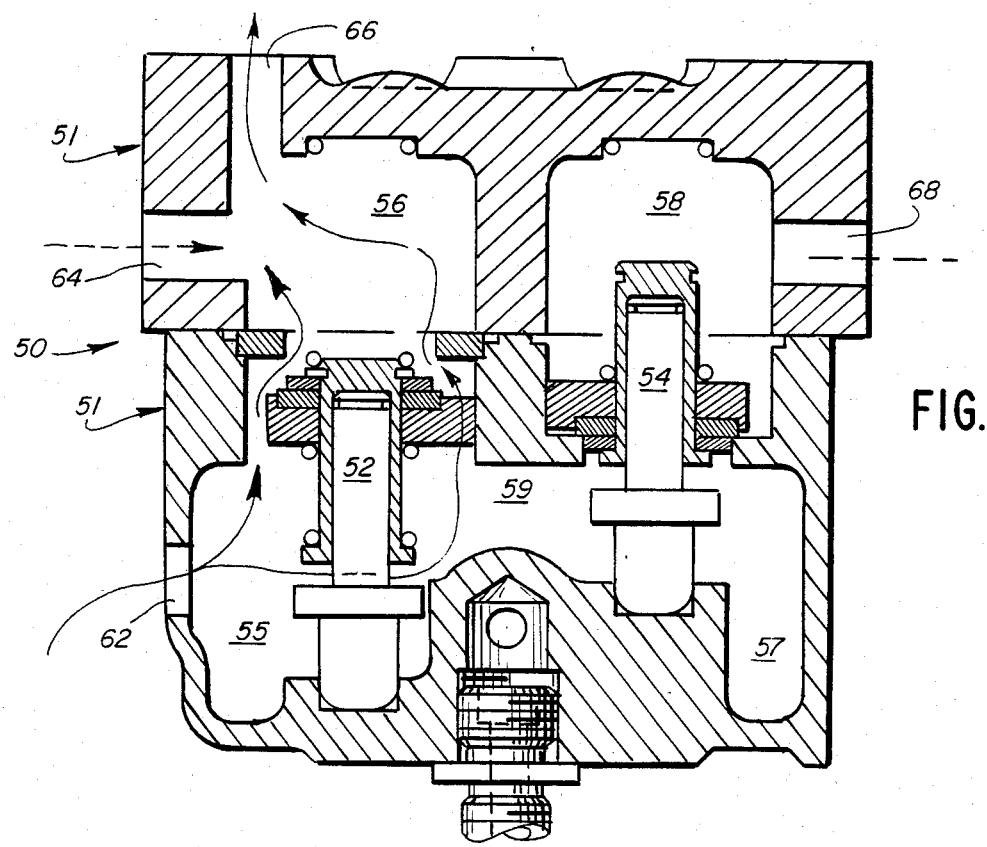
FIG. 5 is a fragmentary enlarged cross-sectional side view of a dual valve thermostat comprising a component of the improved cooling system and showing the flow path of the coolant in a full bypass mode.
Figure 6:
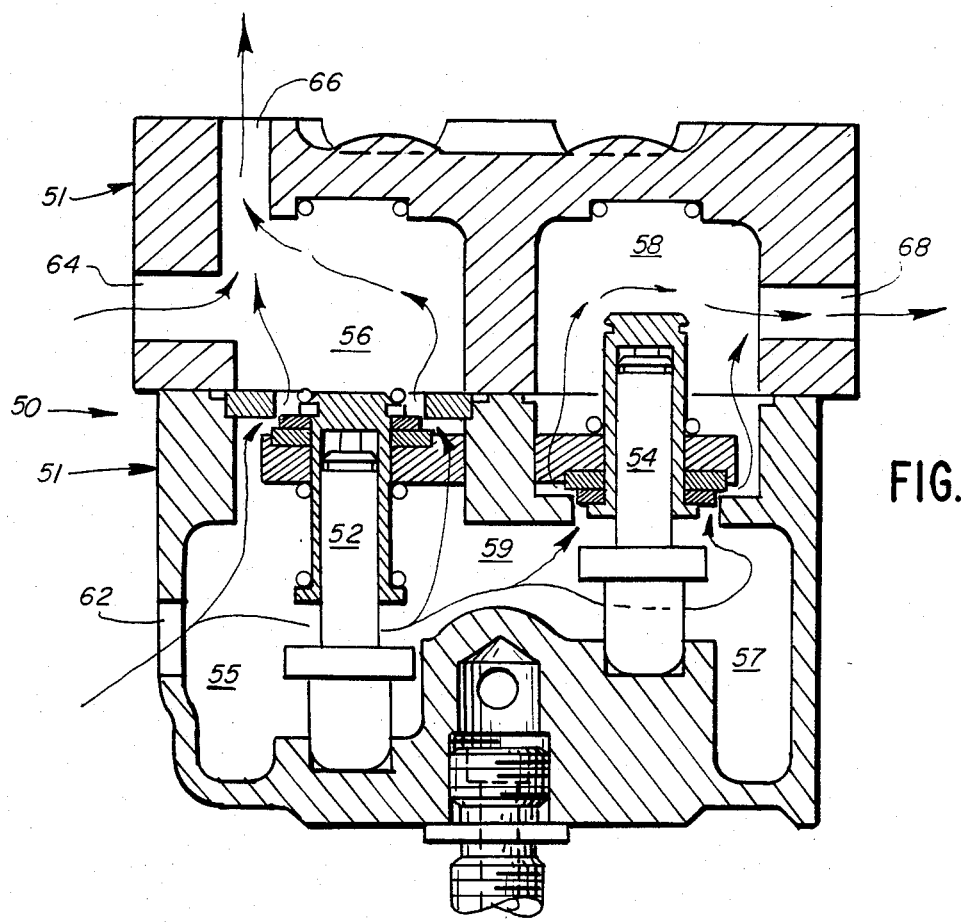
FIG. 6 is similar to FIG. 5 but showing the flow path of the coolant through the thermostat when the system is operating in a mode between a full cooling mode and a full heating mode.
Figure 7:
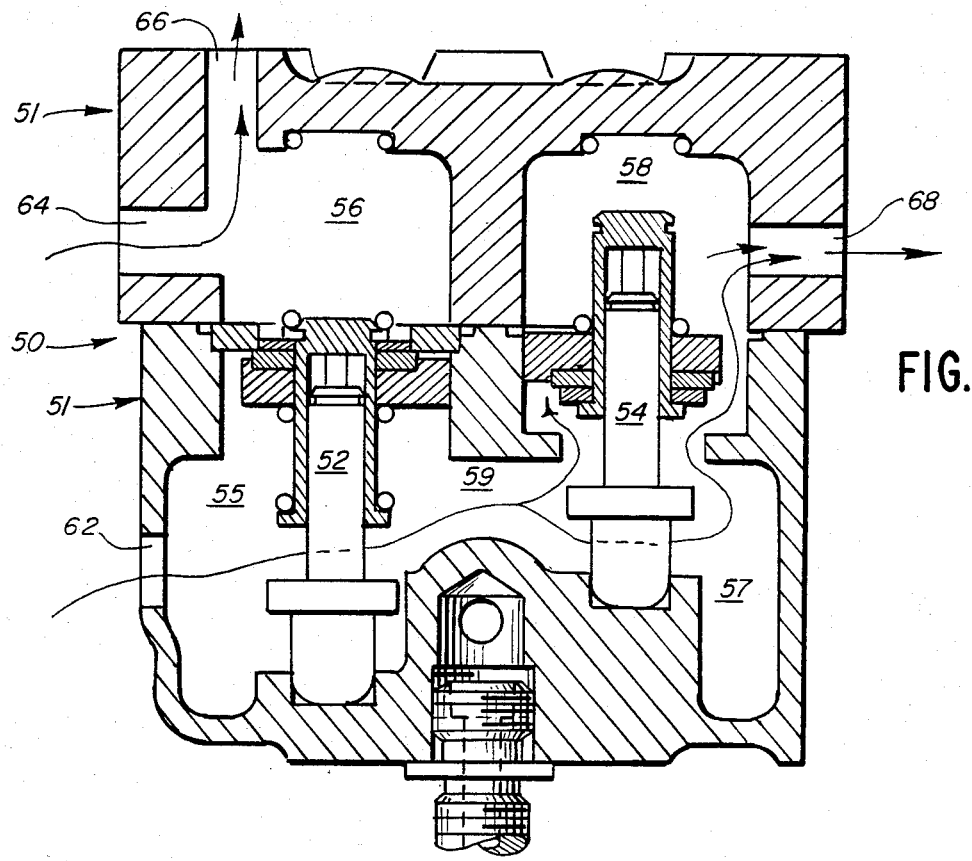
FIG. 7 is similar to FIG. 5 but showing the flow path of the coolant through the thermostat when the system is in a full cooling mode.

Turning to FIGS. 5, 6 and 7, a dual valve thermostat 50 for effecting the logic control system of the present invention is shown in various modes of operation. The flow of coolant through the dual valve thermostat 50 is indicated by the arrows shown. The dual valve thermostat 50 comprises a housing 51 which defines essentially four chambers: lower 55 and upper 56 bypass chambers, and lower 57 and upper 58 cooling chambers. Disposed between the upper and lower bypass chambers 55 and 56 is bypass control valve section 52; similarly, disposed between the upper and lower cooling chambers 57 and 58 is cooling control valve section 54. The housing 51 also defines various ports for fluidly coupling the dual valve thermostat 50 to other components of the diesel engine. Thus, a port 62 is provided for coupling the lower heating chamber 55 to receive the coolant from the oil cooler 10; a port 64 allows the fluid coupling of upper bypass chamber 56 to receive the coolant from the outlet 34 of radiator 30; port 66 permits the fluid coupling of upper bypass chamber 56 to the inlet 22 of aftercooler 20; and port 68 permits the fluid coupling of upper bypass chamber 58 to the inlet 32 of radiator 30. It will also be observed that in the embodiment illustrated, the housing 51 further defines a passage 59 fluidly coupling lower bypass chamber 55 to lower cooling chamber 57.

As seen in FIG. 5, the dual valve thermostat 50 is shown in a full bypass mode which occurs when the temperature of the coolant sensed by the thermostat from the oil cooler 10 is below a predetermined first setpoint temperature. Thus, coolant from the oil cooler 10 enters lower bypass chamber 55 where it is allowed to proceed by bypass valve 52 into upper bypass chamber 56 and then, through port 66, to the aftercooler 20. Flow of the coolant to the radiator 30 is prevented by the closed condition of cooling valve 54, which blocks passage of the coolant to upper cooling chamber 58. In accordance with the logic control of the present invention the cooling valve 54 remains closed until the temperature sensed by the thermostat 50 exceeds a predetermined setpoint temperature, hereinafter referred to as the third setpoint temperature. It will also be observed that in this condition no coolant flows through port 64 from the radiator 30 due to the closure of cooling valve 54.

FIG. 6 shows the operation of the dual valve thermostat 50 in a mode intermediate the full bypass and full cooling modes. Thus, it will be seen that the coolant from oil cooler 10 enters through port 62 and is divided into two flow paths, one which proceeds into the lower cooling chamber 57 past the partially open cooling valve section 54 into the upper cooling chamber 58. The other part of the coolant is diverted from the lower bypass chamber 55 up past the partially open bypass control valve section 52 into the upper bypass chamber 56.

Similarly, FIG. 7 illustrates the flow path of the coolant through the dual valve thermostat 50 in a full cooling mode. The total flow from the oil cooler 10 passes through port 62 into lower bypass chamber 55, through passage 59 to lower cooling chamber 57. The coolant continues to flow up past the open cooling control section valve 54 into the upper cooling chamber 58 and then through port 68 to the inlet 32 of radiator 30. The coolant from the outlet 34 of radiator 30 passes through port 64 into upper bypass chamber 56 and then directly through port 66 to the aftercooler 20. In this mode of operation the bypass valve section 52 is in the closed position thus preventing any of the hot coolant discharged from the oil cooler 10 from combining with the cooler coolant discharged from the radiator 30 to the aftercooler 20.

It will be understood by one of ordinary skill in the art having the benefit of this disclosure that the flow profile through the bypass passage 35 and the radiator 30 can now independently be controlled by regulating the operating characteristics of the bypass control valve section 52 and cooling control valve section 54. In particular, by determining the temperatures at which the bypass valve 52 is fully open (first setpoint temperature) and at which it is fully closed (second setpoint temperature) and the temperatures at which the cooling control valve 54 is fully closed (third setpoint temperature) and fully open (fourth setpoint temperature), the mixing of coolant from the radiator 30 with hotter coolant from the bypass passage 35 can be eliminated or minimized, while maintaining efficient operation of the cooling system at the two operating extremes, namely, the full cooling mode and the full bypass mode.

Figure 8:
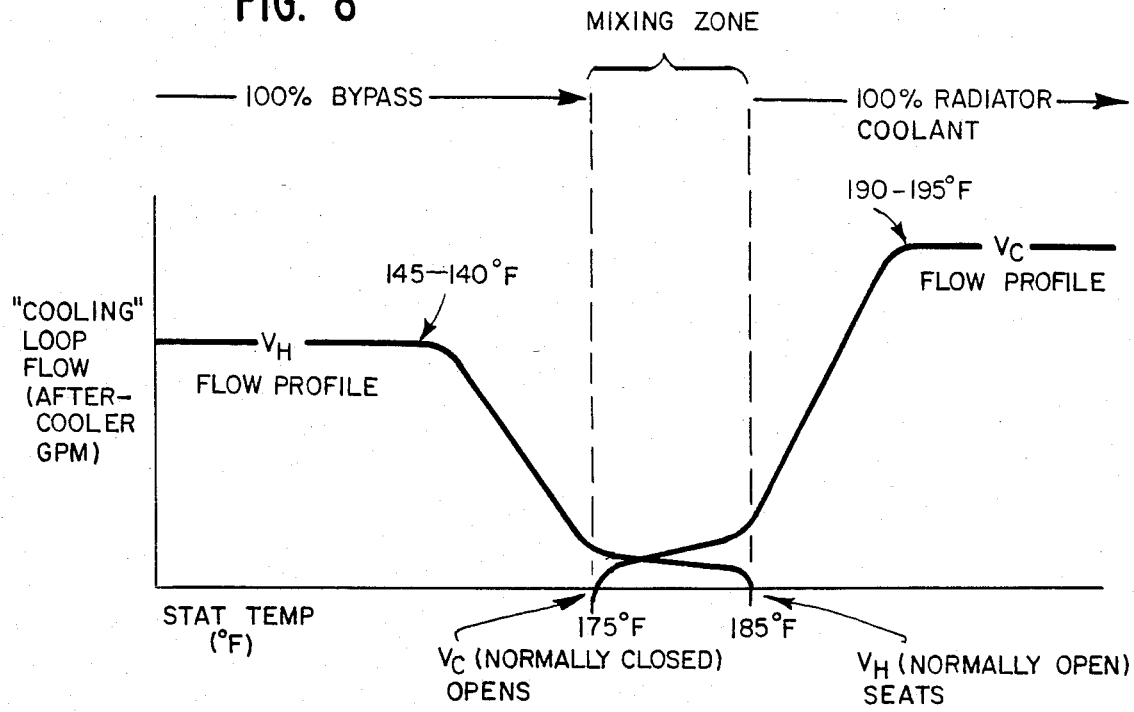
FIG. 8 is one flow profile attainable by the logic control system of the present invention showing the flow rate of coolant through the aftercooler in relation to the temperature of the heat exchange medium discharged from the oil cooler as sensed by the dual valve thermostat of the present invention.

FIG. 8 is a graphical illustration of one flow profile attainable by the logic control system of the present invention. The graph compares cooling loop flow, measured at the aftercooler inlet 22 in gallons per minute, versus the temperature sensed by the dual valve thermostat 50 in degrees fahrenheit. For this particular embodiment it can be seen that the flow in the cooling loop 70 is relatively constant until the bypass valve section 52 begins to seat or close at approximately 140° to 145° F. (the first setpoint temperature). At approximately 175° F. (the third setpoint temperature) the cooling valve section 54 begins to open and between 175° to 185° F. the flow through the aftercooler is a combination of the flows passing the sections of cooling control valve 54 and bypass control valve 52. At 185° F. (the second setpoint temperature) the heating control valve section 52 is completely closed preventing the flow of coolant through the bypass passage 35. The cooling valve section reaches a full open position at approximately 190° to 195° F. (the fourth setpoint temperature), at which point a constant flow rate through the cooling loop is achieved. In general, it is preferable for a diesel engine having a cooling system of a type generally described above to employ a flow profile in which the ratio of the difference between the second setpoint temperature and the first setpoint temperature to the difference between the fourth setpoint temperature and the first setpoint temperature is in the range of about 0.1 to about 0.5.

Figure 9:
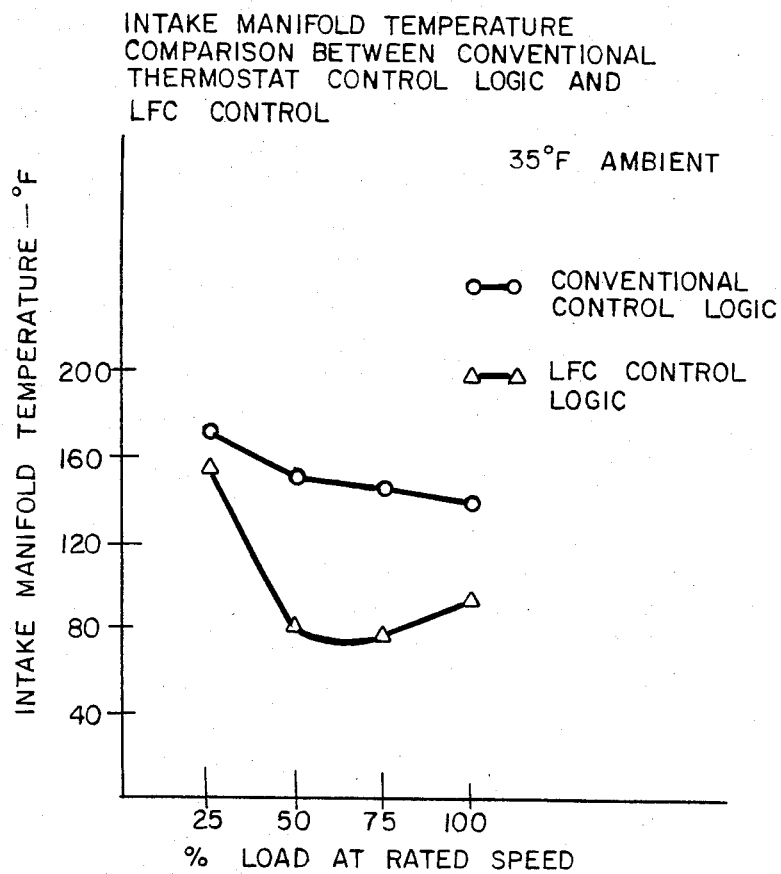
FIGS. 9, 10, and 11 are graphs showing the intake manifold temperature for a diesel engine versus the percent load on the engine for an engine equipped with conventional control logic and for an engine equipped with the logic control system of the present invention at ambient air temperatures of 35° F., 60° F., and 85° F., respectively.
Figure 10:
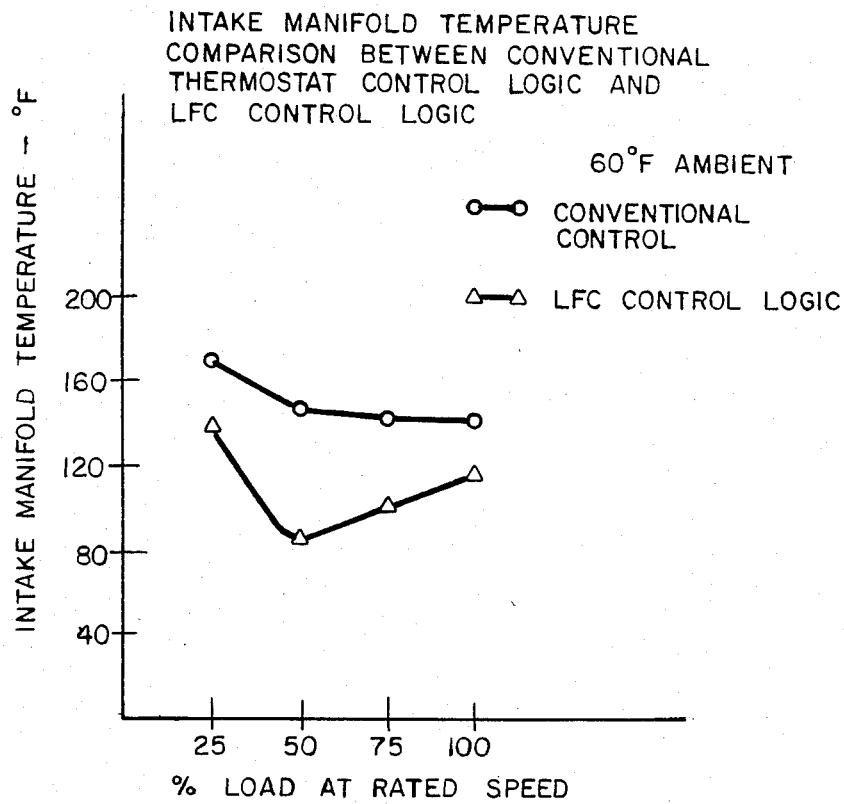
Figure 11:
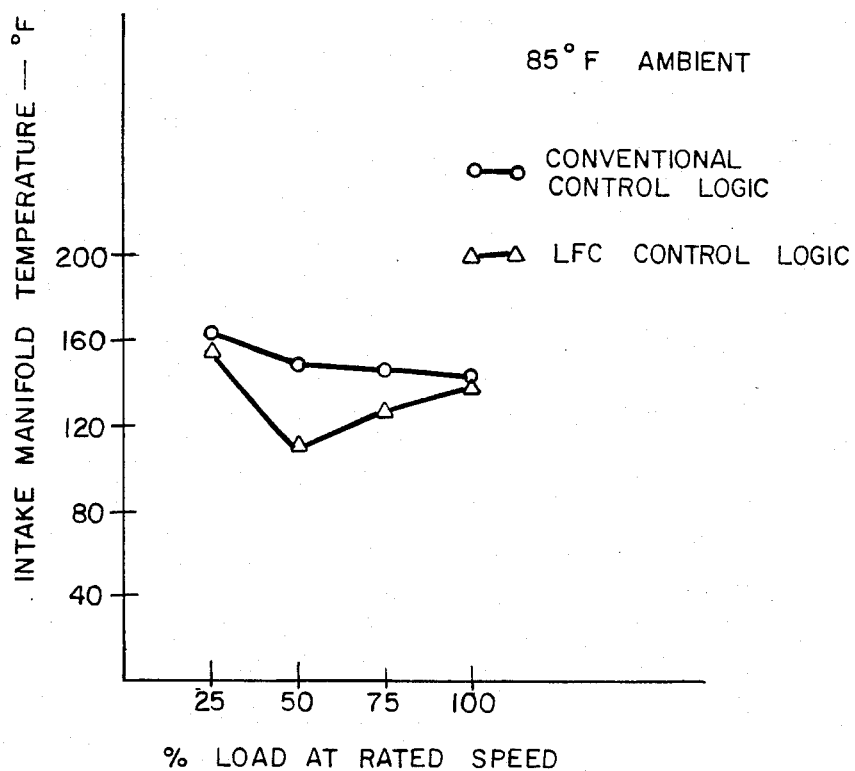

FIGS. 9, 10, and 11 illustrate at least one of the benefits of this invention. A comparison is made of the intake manifold temperature for a diesel engine having the logic control system of the present invention to the intake manifold temperature of a diesel engine having prior art flow control logic of substantial and continued bypass flow during modulation of the flows for various ambient temperatures and various loadings of the engine. As shown, significantly more cooling of the air charged to the cylinders is achieved when the present invention is utilized. Thus, in FIG. 9, for example, at 50% load and 35° F. ambient temperature, the intake manifold temperature of a diesel engine with a conventional flow control logic is approximately 155° F. whereas in a diesel engine utilizing the present invention, the intake manifold temperature is approximately 80° F. It will readily be appreciated by those of ordinary skill in the art that this illustrates a substantial improvement in engine performance characteristics, including fuel savings and lower emissions.

Many modifications to and other embodiments of the subject invention will come to one skilled in the art having the benefit of foregoing teachings, including the drawings. For example, in place of the dual valve thermostat, the logic control system of the present invention can be effected by remote temperature sensors in communication with a microprocessor which in turn controls solenoid valves. Therefore, the invention is not limited thereto and any modifications are intended to be included within the scope of the appended claims.

What is claimed is:

1. A cooling system for an internal combustion engine having an oil cooler, said system operative in various modes and comprising a combination of a heat exchanger and a heat exchanger bypass passage in parallel connection, said combination being downstream of the oil cooler and serially connected to a discharge end of the oil cooler, pumping means for circulating a heat exchange medium through said cooling system and the oil cooler whereby the temperature potential across the heat exchanger is increased, thereby permitting a reduction in the size of the heat exchanger, and control means for sensing the temperature of the heat exchange medium at at least one predetermined location in the cooling system and in response to the temperature sensed, effecting flow of substantially all of the medium discharged from the oil cooler through only the combination heat exchanger when the cooling system is in a full cooling mode; effecting flow of substantially all of the medium discharged from the oil cooler through only combination bypass passage when the cooling system is in a full heating mode; and effecting predetermined proportioning of substantially all of the medium discharged from the oil cooler between the heat exchanger and the bypass passage of said combination when said cooling system is operating in a mode intermediate the full cooling and full heating modes.

2. The cooling system set forth in claim 1 wherein said control means sense the temperature of the heat exchange medium at the discharge end of the oil cooler.

3. The cooling system set forth in claims 2 or 1 further comprising a first flow circuit connected to said pumping means for circulating a predetermined first amount of the heat exchange medium to predetermined portions of the engine, and a second flow circuit connected to said pumping means for circulating a predetermined second amount of the heat exchange medium, the second circuit having included therein in serially connected relation the oil cooler, said combination of a heat exchanger and a bypass passage, and an aftercooler wherein substantially all the heat exchange medium from the combination is the input to the aftercooler.

4. The cooling system set forth in claim 3 wherein said first flow circuit further comprises a cab heater connected in parallel to the predetermined flow paths through the engine.

5. A logic control system for an internal combustion engine having a cooling system including a combination of a heat exchanger and a bypass passage in parallel connection, an aftercooler serially connected to the combination and disposed immediately downstream thereof and pumping means for circulating a heat exchange medium through said cooling system, said logic control system comprising:

temperature sensing means for sensing the temperature of the heat exchange medium at one or more locations in the cooling system;

bypass logic control means for effecting control of the flow of heat exchange medium through said bypass passage whereby maximum flow through the bypass passage is effected when the temperature sensed by said temperature sensing means at a first predetermined location in the cooling system is equal to or below a first setpoint temperature, and whereby no flow through the bypass passage is effected when the temperature sensed by said temperature sensing means at the first location is equal to or greater than a second setpoint temperature greater than said first setpoint temperature;

cooling logic control means for effecting control of the flow of heat exchange medium through the heat exchanger whereby no flow through the heat exchanger is effected when the temperature sensed by said temperature sensing means at a second predetermined location is equal to or below a third setpoint temperature, and whereby maximum flow through the heat exchanger is effected when the temperature sensed by said temperature sensing means at the second location is equal to or greater than a fourth setpoint temperature greater than said third setpoint temperature; and wherein said third setpoint temperature is independent of said first setpoint temperature and said fourth setpoint temperature is independent of said second setpoint temperature.

6. The logic control system set forth in claim 5 wherein said first location is the same as said second location.

7. The logic control means set forth in claim 6 wherein the ratio of the difference between the second setpoint temperature and the first setpoint temperature to the difference between the fourth setpoint temperature and the first setpoint temperature is in the range of about 0.1 to about 0.5.

8. The logic control system set forth in claim 6 or 7 wherein said third setpoint temperature is greater than said first setpoint temperature and said fourth setpoint temperature is greater than said second setpoint temperature.

9. The logic control system set forth in claim 7 wherein said temperature sensing means, said bypass logic control means, and said cooling logic control means comprise a dual valve thermostat.

10. The logic control system set forth in claim 9 wherein said dual valve thermostat comprises:

a housing defining upper and lower bypass control chambers and upper and lower cooling control chambers;

a bypass control valve engaging said upper and lower bypass control chambers, said bypass control valve selectively allowing communication between said upper and lower bypass control chambers only when the temperature of the heat exchange medium in the lower bypass control chamber is less than the second setpoint temperature; and a cooling control valve engaging said upper and lower cooling control chambers, said cooling control valve selectively allowing communication between said upper and lower cooling control chambers only when the temperature of the heat exchange medium in the lower cooling control chamber is greater than the third setpoint temperature.

11. The logic control system system set forth in claim 10 wherein said bypass control valve permits maximum communication between said upper and lower bypass control chambers when the temperature of the heat exchange medium in the lower bypass control chamber is less than the first setpoint temperature, and said cooling control valve permits maximum communication between said upper and lower cooling control chambers when the temperature of the heat exchange medium in the lower cooling control chamber is greater than the fourth setpoint temperature.

12. The logic control system set forth in claim 11 wherein said cooling system also includes an oil cooler serially connected to and upstream of said combination, and wherein the lower bypass control chamber is operatively connected to the oil cooler to receive the heat exchange medium discharged therefrom, the upper bypass control chamber is operatively connected to the heat exchanger to receive the heat exchange medium therefrom, the upper bypass control chamber is operatively connected to the aftercooler for delivering the heat exchange medium thereto, and the upper cooling control chamber is operatively connected to the heat exchanger for delivering the heat exchange medium thereto.

13. The logic control system set forth in claim 12 wherein the lower bypass control chamber and the lower cooling control chamber are in communication with each other.

14. A dual valve thermostat for an internal combustion engine having a cooling system including a combination of a heat exchanger and a bypass passage in parallel connection and pumping means for circulating a heat exchange medium through said cooling system, said dual valve thermostat comprising:

a housing defining upper and lower bypass control chambers and upper and lower cooling control chambers;

a bypass control valve engaging said upper and lower bypass control chambers, said bypass control valve allowing maximum communication between said upper and lower bypass control chambers when the temperature of the heat exchange medium in said lower bypass chamber is less than a first setpoint temperature, and selectively allowing communication between said upper and lower bypass control chambers only when the temperature of the heat exchange fluid is less than a second setpoint temperature; and a cooling control valve engaging said upper and lower cooling control chambers, said cooling control valve selectively allowing communication between said upper and lower cooling control chambers only when the temperature of the heat exchange medium in said lower cooling control chamber is greater than a third setpoint temperature, and allowing maximum communication between said upper and lower cooling control chambers when the temperature of the heat exchanger medium in said lower cooling chamber is greater than a fourth setpoint temperature.

* * * * *